(12) United States Patent
Khawand et al.

(10) Patent No.: US 6,973,538 B2
(45) Date of Patent: Dec. 6, 2005

(54) ADAPTIVE SEGMENTATION OF SHARED CACHE

(75) Inventors: Jean Khawand, Miami, FL (US);
Charbel Khawand, Miami, FL (US);
Chin Pan Wong, Coral Springs, FL (US)

(73) Assignee: Motorola, Inc., Schaumburg, IL (US)

( * ) Notice: Subject to any disclaimer, the term of this patent is extended or adjusted under 35 U.S.C. 154(b) by 314 days.

(21) Appl. No.: 10/405,539

(22) Filed: Apr. 2, 2003

(65) Prior Publication Data

US 2004/0199725 A1   Oct. 7, 2004

(51) Int. Cl.[7] .............................................. G06F 12/00
(52) U.S. Cl. ...................... 711/130; 711/118; 711/170; 711/171; 711/172; 711/173
(58) Field of Search ........................ 711/118, 130–135, 711/170–173

(56) References Cited

U.S. PATENT DOCUMENTS

| | | | | |
|---|---|---|---|---|
| 4,761,737 A | * | 8/1988 | Duvall et al. | ............... 711/209 |
| 5,737,747 A | * | 4/1998 | Vishlitzky et al. | .......... 711/118 |
| 6,226,608 B1 | * | 5/2001 | Fielder et al. | .............. 704/229 |
| 6,647,477 B2 | * | 11/2003 | Janoska et al. | ............. 711/168 |
| 2002/0065992 A1 | | 5/2002 | Chauvel et al. | |

* cited by examiner

*Primary Examiner*—T Nguyen

(57) ABSTRACT

A system, method and computer readable medium are provided for segmenting a cache that is shared by multiple processors. According to the method, a first segment of the cache is allocated to a first processor and a second segment of the cache is allocated to a second processor. An execution time of at least one task on the first processor is monitored. If the execution time of the at least one task is greater than an allowed execution time minus a predetermined margin, the size of the first segment of the cache that is allocated to the first processor is increased. In one preferred method, if the execution time of the at least one task is significantly less than the allowed execution time minus the predetermined margin, the size of the first segment of the cache that is allocated to the first processor is decreased.

21 Claims, 5 Drawing Sheets

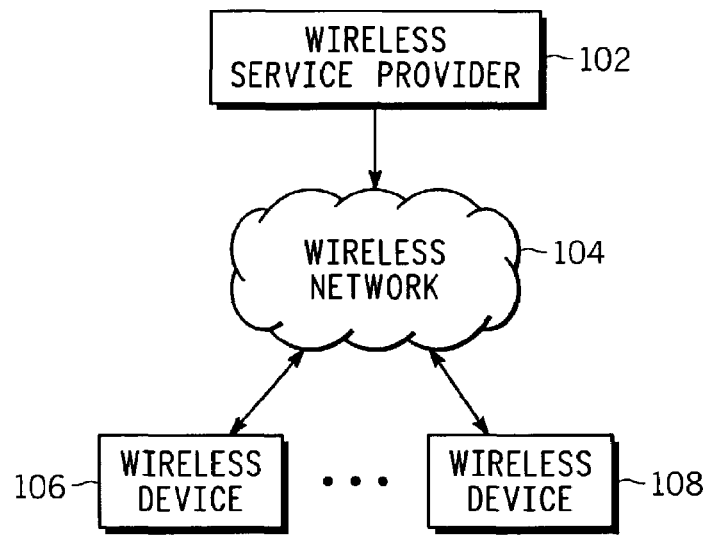
FIG. 1
FIG. 2
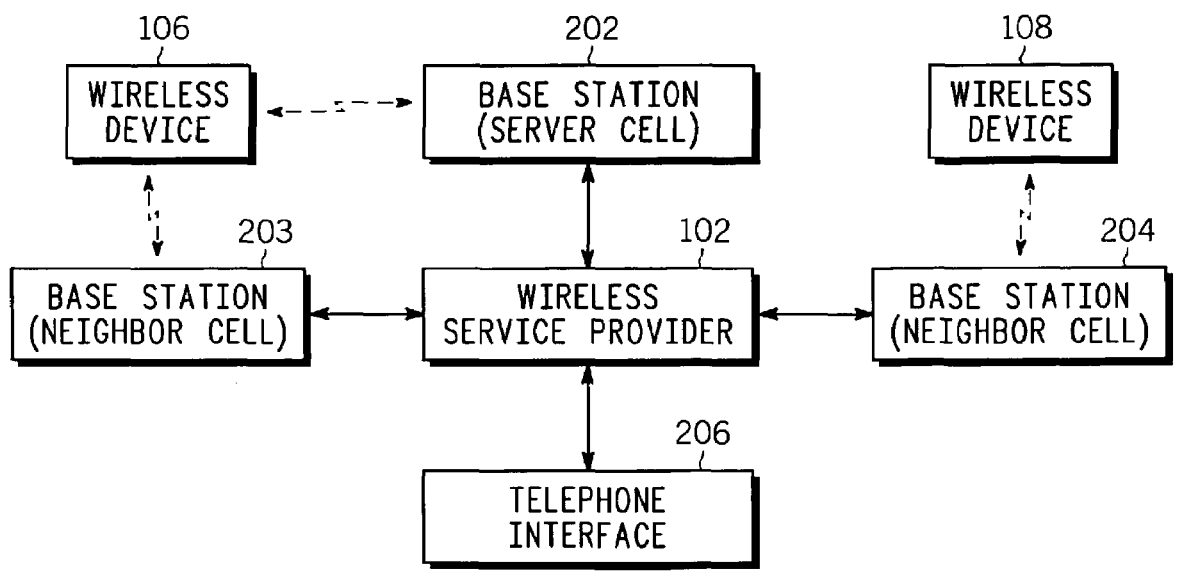

ADAPTIVE SEGMENTATION OF SHARED CACHE

FIELD OF THE INVENTION

The present invention generally relates to the field of computer systems, and more particularly relates to devices having multiple processors.

BACKGROUND OF THE INVENTION

With the advent of pagers and mobile telephones, the wireless service industry has grown into a multi-billion dollar industry. The Cellular Telecommunications and Internet Association calculates that 120 million Americans own a mobile telephone—about half of the U.S. population. As the development of mobile telephones progresses and the availability of bandwidth increases, many mobile customers are upgrading to phones and phone services with features such as picture messaging, camera attachments and other new designs. As a result, smartphones (a combination of a pocket or handheld PC and a mobile telephone) have enjoyed increasing popularity in the wireless service industry. Today, smartphones allow a user to perform many functions that can be performed by a desktop PC, such as web browsing, contact information management, and email management, while providing the user with a compact device that doubles as a mobile telephone.

The conventional architecture of a smartphone includes two separate cores, or processors, that handle the two main processes of the smartphone—telephone call operations and computer application operations. A baseband processor handles the cell operation processes such as call setup and call maintenance of the mobile telephone. An application processor handles the computer application processes associated with the execution of application programs on the device. Typically, a single secondary cache is provided for both processors. A cache provides a secondary memory area for storing and retrieving data and instructions that is much quicker than main memory, such as a Dynamic Random Access Memory (DRAM) module. Each processor attempts to optimize the execution of its own code by utilizing the cache as much as possible. Thus, each processor attempts to populate the cache with its own instructions and data.

The execution speed of each processor is dependent on its cache hit rate—the percentage of times the processor finds the required instructions or data in the cache. Whereas in a one-processor system the only cache restriction on the processor is the cache size, in a multiple processor system each processor is additionally restricted by the amount of the cache used by the other processors. In a system in which multiple processors share one cache, information cached by one processor can be thrashed, or quickly overwritten, by the other processor. This decreases the execution speed.

While this situation may be acceptable in some applications because the only effect is a slower user response, for a baseband processor of a smartphone this situation is unacceptable since it may lead to a reduction in execution speed that prevents the core from performing its mobile communications processes within required time limits. A slow speed in the baseband processor may lead to deterioration in the call audio and, more drastically, to dropped calls.

Therefore a need exists to overcome the problems with the prior art as discussed above.

SUMMARY OF THE INVENTION

Briefly, in accordance with one aspect of the present invention, there is disclosed a method for segmenting a cache that is shared by multiple processors. According to the method, a first segment of the cache is allocated to a first processor and a second segment of the cache is allocated to a second processor. An execution time of at least one task on the first processor is monitored. If the execution time of the at least one task is greater than an allowed execution time minus a predetermined margin, the size of the first segment of the cache that is allocated to the first processor is increased. In a preferred method, if the execution time of the at least one task is significantly less than the allowed execution time minus the predetermined margin, the size of the first segment of the cache that is allocated to the first processor is decreased.

In accordance with another aspect of the present invention, there is disclosed an information processing system that includes first and second processors, a shared cache coupled to the first and second processors, and a cache controller coupled to the cache for segmenting the cache between the first and second processors. The cache controller operates such that if an execution time of at least one task on the first processor is greater than an allowed execution time for the at least one task minus a predetermined margin, a size of a first segment of the cache allocated to the first processor is increased. In one preferred embodiment, the information processing system is a mobile phone, the first processor is a baseband processor for handling call operations, and the second processor is an application processor.

The preferred embodiments of the present invention are advantageous because they allow dynamic optimization of the segmentation of a shared cache. This allows a first processor to have a large enough cache segment to maintain satisfactory execution times for time critical tasks while allocating the remaining cache space to one or more other processors. Thus, efficient use of the cache can be achieved.

Another advantage of the present invention is the adaptive nature of the segmentation algorithm. Because system performance is monitored, the proper segmentation under present operating conditions can be dynamically achieved. This allows for the segmentation of the cache in a variety of modes or operating conditions that require various and disparate cache segmentations to achieve efficient performance.

BRIEF DESCRIPTION OF THE DRAWINGS

FIG. 1 is a block diagram illustrating a conventional wireless communication system.

FIG. 2 is a more detailed block diagram of a conventional wireless communication system.

DETAILED DESCRIPTION

Figure 3:
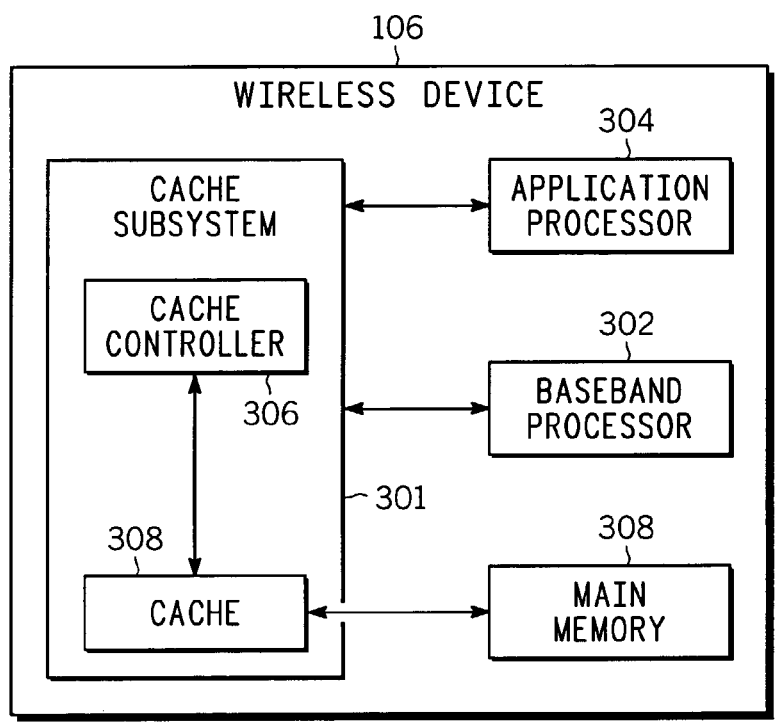
FIG. 3 is a block diagram illustrating a wireless device for a wireless communication system according to a preferred embodiment of the present invention.

The present invention, according to a preferred embodiment, advantageously overcomes problems with the prior art by providing an adaptive algorithm for segmenting a cache shared by multiple processors, as will be discussed in detail below.

I. Overview

FIG. 1 is a block diagram illustrating a conventional wireless communication system. FIG. 1 shows a wireless service provider 102 operating on a wireless network 104, which connects the wireless service provider 102 with wireless devices 106 and 108. The wireless service provider 102 is a first-generation analog mobile phone service, a second-generation digital mobile phone service or a third-generation Internet-capable mobile phone service. The wireless network 104 is a mobile phone network, a mobile text messaging device network, a pager network, or the like. Further, the communications standard of the wireless network 104 of FIG. 1 is Code Division Multiple Access (CDMA), Time Division Multiple Access (TDMA), Global System for Mobile Communications (GSM), General Packet Radio Service (GPRS), Frequency Division Multiple Access (FDMA) or the like.

The wireless network 104 supports any number of wireless devices 106 through 108, which are mobile telephones, smart phones, text messaging devices, handheld computers, pagers, beepers, or the like. A smart phone is a combination of 1) a pocket PC, handheld PC, palm top PC, or Personal Digital Assistant (PDA) and 2) a mobile telephone. More generally, a smartphone is a mobile telephone that has additional application processing capabilities. Wireless devices 106 through 108 are described in greater detail below.

FIG. 2 is a more detailed block diagram of the wireless communication system of FIG. 1. The wireless communication system of FIG. 2 includes the wireless service provider 102 coupled to base stations 202, 203, and 204, which represent the wireless network 104 of FIG. 1. The base stations 202, 203, and 204 individually support portions of a geographic coverage area containing subscriber units or transceivers (i.e., wireless devices) 106 and 108 (see FIG. 1). The wireless devices 106 and 108 interface with the base stations 202, 203, and 204 using a communication protocol, such as CDMA, FDMA, CDMA, GPRS and GSM. The wireless service provider 102 is interfaced to an external network (such as the Public Switched Telephone Network) through a telephone interface 206.

The geographic coverage area of the wireless communication system of FIG. 2 is divided into regions or cells, which are individually serviced by the base stations 202, 203, and 204 (also referred to herein as cell servers). A wireless device operating within the wireless communication system selects a particular cell server as its primary interface for receive and transmit operations within the system. For example, wireless device 106 has cell server 202 as its primary cell server, and wireless device 108 has cell server 204 as its primary cell server. Preferably, a wireless device selects a cell server that provides the best communication interface into the wireless communication system. Ordinarily, this will depend on the signal quality of communication signals between a wireless device and a particular cell server.

As a wireless device moves between various geographic locations in the coverage area, a hand-off or hand-over may be necessary to another cell server, which will then function as the primary cell server. A wireless device monitors communication signals from base stations servicing neighboring cells to determine the most appropriate new server for hand-off purposes. Besides monitoring the quality of a transmitted signal from a neighboring cell server, the wireless device also monitors the transmitted color code information associated with the transmitted signal to quickly identify which neighbor cell server is the source of the transmitted signal.

FIG. 3 is a block diagram illustrating a wireless device for a wireless communication system according to a preferred embodiment of the present invention. For example, the wireless device of FIG. 3 can be one of the wireless devices described of FIGS. 1 and 2. FIG. 3 shows a wireless device 106 that is a two-way radio capable of receiving and transmitting radio frequency signals over a communication channel under a communications protocol such as CDMA, FDMA, CDMA, GPRS or GSM. During normal operation, the wireless device 106 switches between receive and transmit modes. In receive mode, an antenna is coupled through a transmit/receive switch to a receiver, which decodes the received signals. In transmit mode, the antenna is coupled through the switch to a transmitter.

In preferred embodiments of the present invention, the wireless device 106 is a smart phone. In such embodiments, the wireless device 106 includes more than one processor—a baseband processor 302 and an application processor 304. The baseband processor 302 handles those processes associated with the call setup and call maintenance processes of the wireless device 106. The application processor 304 handles those processes associated with the execution of application programs on the PC portion of the wireless device 106. FIG. 3 also shows a main memory module 310, such as a volatile memory element like a Dynamic Random Access Memory (DRAM) module. The baseband processor 302 and the application processor 304 have access to the main memory module 310, which is used for storing and retrieving data and instructions necessary for performing the functions of wireless device 106.

Each processor has a relatively small primary cache. FIG. 3 also shows that a single larger secondary cache 308 is provided for both processors. Each cache provides a memory area for quickly storing and retrieving data and instructions. The secondary cache 308 mirrors data that is stored in the main memory 310 for the purpose of providing a quicker location for accessing information. Storing and retrieving information from a cache is much quicker than with the main memory. Therefore, each processor attempts to optimize the execution of its own code by utilizing the secondary cache 308 as much as possible. In other words, each processor proceeds to populate the cache 308 with its own instructions and data.

FIG. 3 also shows a cache controller 306 for controlling access to the cache 308 and for allocating segments within the cache 308 for the baseband processor 302 and the application processor 304. The cache controller 306 regulates all accesses to the cache 308 and implements instructions for allocating and de-allocating segments within the cache 308. All accesses to the cache 308 by the baseband processor 302 and the application processor 304 are made via the cache controller 306. The process of determining the manner in which to allocate and de-allocate segments within the cache 308 is described in greater detail below. The cache controller 306 and the cache 308 make up a cache subsystem 301.

II. Task Execution Timing

As explained above, the present invention provides an adaptive algorithm for segmenting a cache shared by multiple processors. Execution timing of time critical tasks (i.e., the amount of time it takes to execute a time critical task) is one of the factors considered by the adaptive segmenting algorithm when determining the manner in which to segment the cache. A processor, such as the baseband processor 302, monitors at least one of the time critical tasks performed by the baseband processor 302 for the purpose of determining whether time critical tasks are being executed within the required execution time. If time critical tasks take longer than the required execution time to execute, a reduction in execution speed may occur, preventing the core from performing its mobile communications processes. This may lead to deterioration in the call audio and even to dropped calls.

Figure 4:
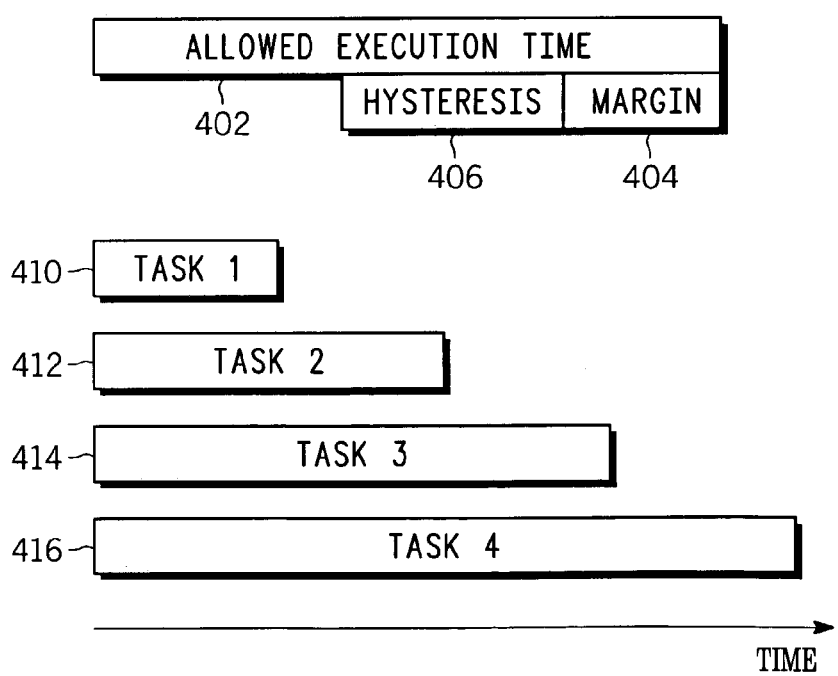
FIG. 4 is an exemplary timing diagram for time critical tasks.

FIG. 4 is an exemplary timing diagram for time critical tasks. FIG. 4 shows a group of time critical tasks compared to a required, or allowed, execution time. Each time critical task, due to the time sensitive nature of the task, is associated with a required, or allowed, execution time. FIG. 4 shows time measurement indicators along the top of the figure, indicating the passage of time from left to right. The allowed execution time 402 indicates the amount of time allowed for the completion of a time critical task. The margin window 404 is a time period that allows for a variation in the boundary of the allowed execution time 402. This variation is provided due to aberrations in task algorithms or operating factors such as cache misses. The hysteresis window 406 is an additional threshold that must be met in order to identify time critical tasks that are completed significantly before the allowed execution time 402.

FIG. 4 shows four time critical tasks 410, 412, 414 and 416 that each have the same allowed execution time 402. As the passage of time passes from left to right for each task, task 410 is clearly completed before the allowed execution time 402. Task 410 is also completed before the margin window 404 and the hysteresis window 406. Because the execution of task 410 is completed before the allowed execution time 402 (AET), the margin window 404 (M) and the hysteresis window 406 (H), the task 410 satisfies the equation:

Task Execution Time<AET-$M$-$H$

Therefore, the processor could endure additional cache misses without exceeding the allowed execution time 402. In preferred embodiments of the present invention, the portion of the secondary cache allocated to the processor executing task 410 is reduced in such cases to improve overall system performance. In other words, the processor is operating significantly ahead of schedule with regard to execution of a time critical task, and therefore cache space is released or de-allocated for use by another processor.

Task 412 is also completed before the allowed execution time 402 and the margin window 404, but not the hysteresis window 406. That is, task 412 is completed during the hysteresis window 406. Because the execution of task 412 is completed before the allowed execution time 402 (AET) and the margin window 404 (M), task 412 satisfies the equation:

Task Execution Time<AET-$M$

Therefore, the processor executing task 412 is not able to endure additional cache misses without potentially exceeding the allowed execution time 402. The hysteresis window 406 is an additional threshold that identifies time critical tasks that are completed significantly before the allowed execution time 402. In the present case, task 412 is not completed before the hysteresis window 406, so the cache segmentation is not changed.

Task 414 is completed only before the allowed execution time 402. That is, task 414 is completed during the margin window 404. Because the execution of task 414 is completed only before the allowed execution time 402 (AET), the task 414 satisfies the equation:

Task Execution Time<AET

Because the processor is not able to accomplish task 414 before the margin 404, there is a significant potential that this task could exceed the allowed execution time 402. In preferred embodiments of the present invention, the portion of the secondary cache allocated to the processor executing task 414 is increased. In other words, if the processor is not able to complete the execution of a time critical task before the margin 404, then additional cache space is allocated to the processor.

Thus, the margin window 404 is a time period that provides an allowed variation in the execution time. This variation is provided due to aberrations in task algorithms and operating conditions.

Task 416 is completed after the allowed execution time 402. Therefore, the task 416 satisfies the equation:

Task Execution Time>AET

Thus, the processor must be allocated additional cache space to increase the execution speed of its time critical tasks. If a processor is not able to complete the execution of a time critical task before the allowed execution time 402 (AET), then additional cache space must be allocated to the processor.

III. Cache Segmentation Algorithm

Figure 5:
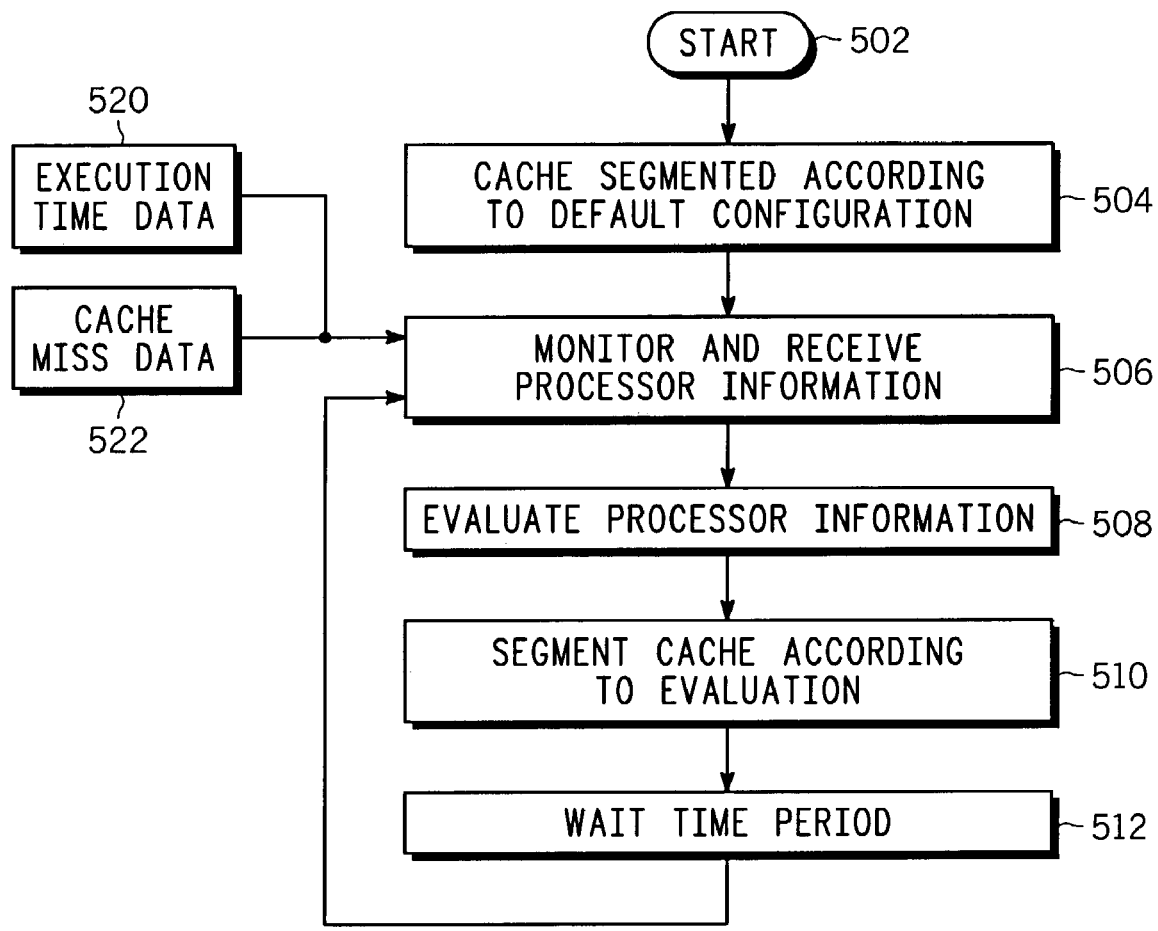
FIG. 5 is an operational flow diagram showing the overall cache segmentation process according to a preferred embodiment of the present invention.

FIG. 5 is an operational flow diagram showing the overall cache segmentation process according to a preferred embodiment of the present invention. The operational flow diagram of FIG. 5 depicts the process, of monitoring multiple processor operations and adaptively segmenting a cache that is shared by the processors. The operational flow diagram of FIG. 5 begins with step 502 and flows directly to step 504.

In step 504, the cache 308 is initially segmented among more than one processor, such as processors 302 and 304. In one embodiment, the cache 308 is initially segmented according to a predetermined default configuration. For example, in one embodiment a worst-case scenario is assumed and the baseband processor is allocated all of the cache space, and in another embodiment a predetermined configuration is set based on theoretical baseband processor requirements. In further embodiments, the cache 308 is initially segmented according to stored empirical data. For example, in one embodiment an initial cache space allocation representative of historical performance is stored in the baseband processor memory. Further, while in some embodiments step 504 is only performed at startup, in preferred embodiments step 504 is also performed each time the device transfers to a new operating mode. For example, in one embodiment, step 504 is performed each time the baseband processor transitions between modes that each define a specific function of the device, such as "camped", "dispatch", and "call-in-progress". The default configuration for each mode can be predetermined or based on historical performance.

In step 506, information pertaining to processors 302 and 304 is monitored and/or received. The information that is monitored and/or received includes execution time data 520 and cache miss data 522. Execution time data 520 includes, for each time critical task, a required or allowed execution time, and an actual execution time. With reference to FIG. 4, the allowed execution time 402 indicates the amount of time allowed for the timely completion of a time critical task, while the actual execution time indicates the amount of time that actually passed for the completion of the time critical task, as shown by the length of the time critical task blocks 410, 412, 414 and 416.

Cache miss data 522 includes the number of (or percentage of) cache misses associated with each processor. In some embodiments, the cache miss data is tied to specific tasks, while in other embodiments it is not. In some embodiments, the cache miss data 522 only indicates whether or not there were any cache misses during execution of a specific task. Cache miss data 522 is an indicator of processor performance because it provides information as to how many times the processor was not able to access instructions or data from the cache 308 and instead had to access the main memory 310. This translates into increased execution time, as the accessing of data or instructions from the cache 308 is much quicker than from main memory 310.

In step 508, the information monitored or received in step 506 (execution time data 520 and cache miss data 522) is evaluated in order to determine if the segmentation of the cache should be changed. In step 510, the cache 308 is segmented in accordance with the determination of step 508.

In optional step 512, the algorithm waits a time period until control flows back to step 506. In this manner, steps 506–512 are executed iteratively until the wireless device 106 is turned off. In one embodiment, the algorithm waits a time period T of about 15, 45 or 90 milliseconds until control flows back to step 506. In another embodiment, the algorithm waits for the next TDMA frame, or a specified number of frames until control flows back to step 506. Alternatively, steps 506–510 can be executed each time a task or time critical task is completed.

In preferred embodiments of the present invention, a waiting time period T is employed (such as in step 512) only if it is determined that all time critical tasks were completed before their respective allowed execution times. On the other hand, whenever it is determined that any time critical task did not complete before its allowed execution time, then control flows directly to step 506 to determine if changing the cache segmentation is proper under the circumstances (e.g., was delayed execution caused by cache misses). Further, the subsequent waiting time period T is then preferably set so as to insure that the time critical task at issue is re-evaluated the next time it is executed. Thus, in such embodiments, the waiting time period T only applies when all time critical tasks are completed within their respective allowed execution times (with or without the hysteresis period, depending on the specific embodiment).

The process of segmenting the cache 308 in accordance with the completion or non-completion of time critical tasks before their allowed execution times is described in greater detail below.

Figure 6:
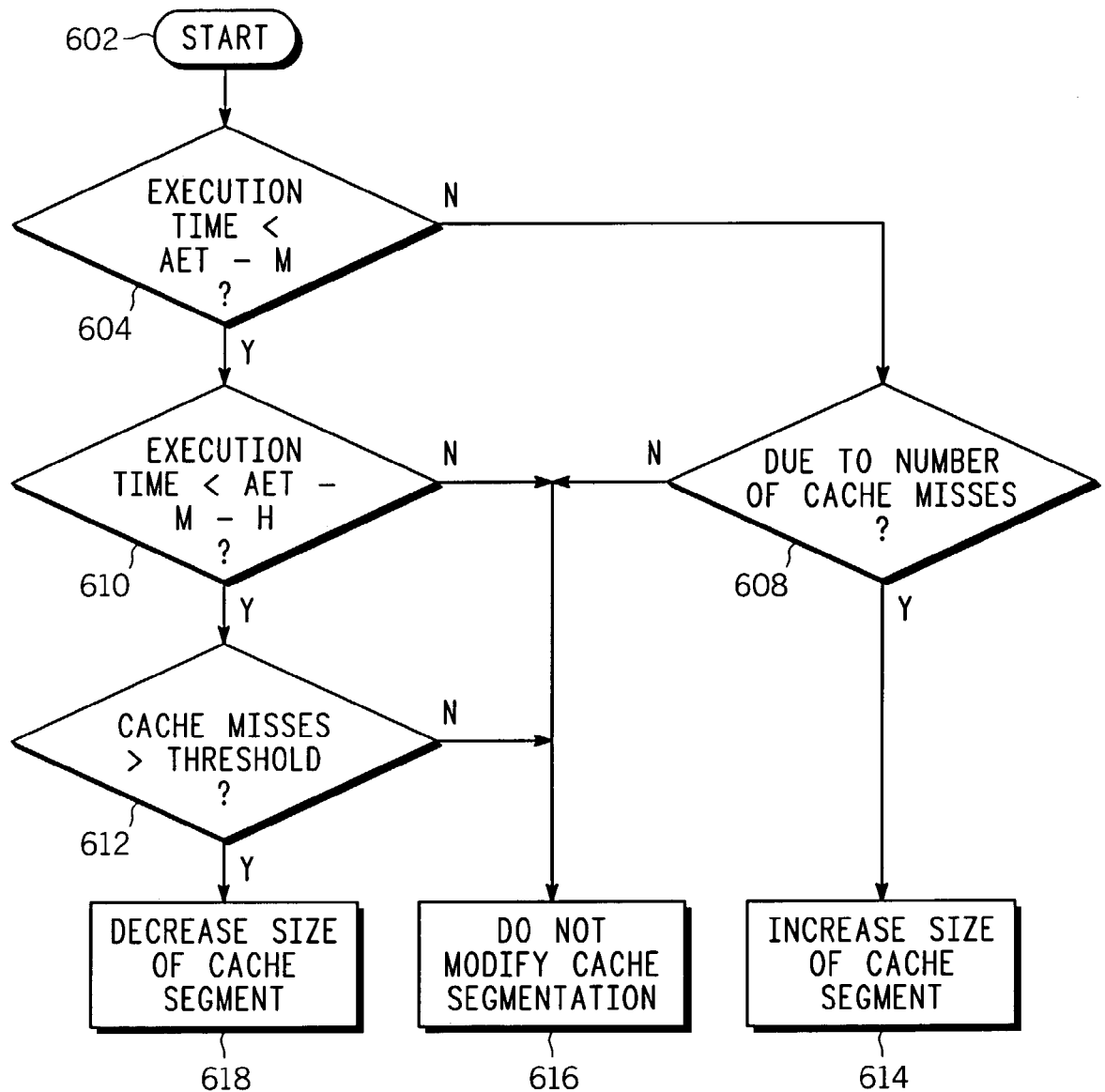
FIG. 6 is an operational flow diagram showing the cache segmentation evaluation process according to a preferred embodiment of the present invention.

FIG. 6 is an operational flow diagram showing the cache segmentation evaluation process according to a preferred embodiment of the present invention. The operational flow diagram of FIG. 6 depicts the process of evaluating conditions on a processor and determining the manner in which to segment the cache space in view of the present operating conditions. Although FIG. 6 shows a flow that is performed once, the processes described in FIG. 6 are performed repeatedly when considered as a part of the iterative process of FIG. 5.

The process of FIG. 6 can be performed by any of a plurality of processors of a multi-processor device. Preferably, the process of FIG. 6 is performed by the baseband processor 302 of a wireless device 106.

The operational flow diagram of FIG. 6 begins with step 602 and flows directly to step 604. The decision blocks 604–612 each show a decision that must be evaluated with reference to at least one task that is executed by a processor (for example, baseband processor 302). In one embodiment, the decision blocks 604–612 each show a decision that must be evaluated with reference to one task that is being executed by the processor. In another embodiment, the decision blocks 604–612 each show a decision that must be evaluated with reference to multiple or all tasks recently executed by the processor.

In step 604, it is determined whether the task is completed before the allowed execution time 402 and the margin window 404 (see task 412 of FIG. 4). That is, it is determined whether the task satisfies the equation:

Task Execution Time<AET–M

If the result of the determination of step 604 is positive, then control flows to step 610. If the result of the determination of step 604 is negative, then control flows to step 608.

In step 610, it is determined whether the task is completed before the allowed execution time 402, the margin window 404, and the hysteresis window 406 (see task 410 of FIG. 4). That is, it is determined whether the task satisfies the equation:

Task Execution Time<AET–M–H

If the result of the determination of step 610 is positive, then control flows to step 612. If the result of the determination of step 610 is negative, then control flows to step 616.

In step 612, it is determined whether the number of (or percentage of) cache misses of another processor is above a threshold. For example, in the preferred embodiment in which the task is executed on the baseband processor 302, it is determined whether the number of (or percentage of) cache misses on the application processor 304 is above a threshold. This cache miss information can be relayed to the baseband processor 302 from application processor 304 via a message or by setting a flag. Alternatively, the information can be determined directly by the cache controller. If the result of the determination of step 612 is positive, then control flows to step 618. If the result of the determination of step 612 is negative, then control flows to step 616.

Step 612 is an optional step for determining whether another processor (e.g., application processor 304) would benefit from having additional cache space allocated to it. Steps 604 and 610 have already determined that the processor executing the task (baseband processor 302) can afford a portion of its cache space. That is, because the baseband processor 302 is currently able to complete the execution of the time critical task before the allowed execution time 402 (AET), the margin window 404 (M) and the hysteresis window 406 (H), the baseband processor 302 can safely endure additional cache misses without creating a significant potential for exceeding the allowed execution time.

While the baseband processor 302 can afford to have cache space de-allocated from it and allocated to the other processor, the allocation of additional cache space for the application processor 304 would only increase the execution speed of tasks on the application processor 304 if cache misses are slowing execution on the application processor. Thus, step 612 determines whether a threshold of cache misses has been surpassed by the application processor 304 before cache space is de-allocated from the baseband processor 302 and allocated to the application processor 304. If the number of cache misses on the application processor 304 is above the threshold, then cache space is de-allocated from the baseband processor 302 and allocated for the application processor 304. Otherwise, the cache allocation is not modified. In some embodiments, step 612 is omitted and a positive determination in step 610 causes flow to proceed directly to step 618.

In step 608, it is determined whether the execution time of the task has been increased due to cache misses by the processor executing the task. The purpose of the step 608 is to determine whether the processor executing the task (e.g., baseband processor 302) would benefit from having additional cache space allocated to it.

The allocation of additional cache space for the baseband processor 302 would only increase the execution speed of tasks on the baseband processor 302 if the cache misses on the baseband processor 302 are the cause of the increased execution time. Thus, step 608 seeks to determine whether cache misses are the cause of the increased execution times on the baseband processor 302. If cache misses are the cause of the delayed execution times on the baseband processor 302, then cache space is de-allocated from the application processor 304 and allocated to the baseband processor 302. Otherwise, the cache segmentation is not modified.

The determination of step 608 can be done using a threshold number (or percentage) of cache misses, as in step 612. However, the determination of step 608 is preferably made by determining if any cache misses occurred during execution of the task. (This is equivalent to setting the threshold to zero cache misses.) This is preferred because if any cache misses occurred during execution of the task, then the execution time can theoretically be decreased by increasing the cache space allocated to the processor executing the task. Further, step 608 is also optional and is omitted in some embodiments so that a negative determination in step 604 causes flow to proceed directly to step 614.

In step 614, cache space allocated to the processor executing the task is increased. That is, in the preferred embodiment, cache space is de-allocated from the application processor 304 and allocated to the baseband processor 302. In step 618, the cache space allocated to the processor executing the task is decreased. That is, cache space is de-allocated from the baseband processor 302 and allocated to the application processor 304. In step 616, the cache segmentation is not modified.

In some embodiments of the present invention, there must be more than one determination that cache space should be increased or decreased before the cache segmentation is changed. In such embodiments, "Increase" and "Decrease" counters are utilized to indicate the number of determinations for increasing cache space of the processor. For example, the "Increase" counter is incremented each time there is a determination for increasing cache space of the processor. When the "Increase" counter has reached a threshold, the size of the cache segment allocated to the processor is increased, and the "Increase" counter is reset to zero. Optionally, whenever there is finding for decreasing cache space of the processor, the "Increase" counter is reset to zero (and vice versa). The "Increase" counter may also be reset to zero whenever there is finding for not modifying the cache space.

In such embodiments, there is a step inserted between step 602 and 604 in which the counters are reset to zero. In addition, there is an additional set of steps inserted immediately before steps 614 and 618 in which the corresponding counter is incremented by one and it is determined whether the counter has reached the threshold. If the threshold has been reached, step 616 or 618 is executed (the cache space allocation is changed) and the counter is reset to zero. Otherwise, control flows to step 616.

Further, the margin and hysteresis windows can be set to any size, including zero. In other words, the hysteresis (H) and/or margin (M) can be set to zero to remove these factors from the equations. The effect of removing one or both of these factors is to increase the frequency that the cache segmentation is changed, as is obvious from the equations and FIG. 6. On the other hand, larger hysteresis and margin windows lead to less frequent cache segmentation changes, possibly with some degradation in overall system performance when these factors are relatively large.

In the preferred implementation, the segmentation of the shared cache is increased or decreased one-way at each iteration in an N-way associative cache. The first processor can reserve 1 through N ways of the cache, so as to be allocated one nth of the cache size. To increase cache size, an additional 1-way is locked for the processor by the cache controller. On the other hand, cache size is decreased by releasing one-way of the cache. In other embodiments, increasing and decreasing can also be stepped up or down by multiple-ways.

Accordingly, the present invention provides an adaptive cache segmentation algorithm that allocates enough cache space to a processor to allow it to perform its time critical tasks. In this context, "enough" means the minimum (or near minimum) amount of cache space needed by the processor to complete all of its tasks on time, and preferably also includes an additional (margin) amount of time to account for small variations in execution time. During execution, task performance is monitored and additional cache space is allocated to the processor if performance is unsatisfactory due to cache misses. Preferably, if execution time is significantly less than required, cache space for the processor is reduced.

IV. Exemplary Implementations

While the preferred embodiments are illustratively described above in relation to a smart phone implementation, the invention is not so limited. The present invention is applicable to any information processing system or computer system that has multiple processors sharing a cache.

Further, the present invention can be realized in hardware, software, or a combination of hardware and software. A system according to a preferred embodiment of the present invention can be realized in a centralized fashion in one information processing system, or in a distributed fashion where different elements are spread across several interconnected systems. Any kind of information processing system—or other apparatus adapted for carrying out the methods described herein—is suited. A typical combination of hardware and software could be a general-purpose computer system with a computer program that, when being loaded and executed, controls the computer system such that it carries out the methods described herein.

An embodiment of the present invention can also be embedded in a computer program product that includes all the features enabling the implementation of the methods described herein, and which, when loaded in a system, is able to carry out these methods. Computer program means or computer program as used in the present invention indicates any expression, in any language, code or notation, of a set of instructions intended to cause a system having an information processing capability to perform a particular function either directly or after either or both of the following a) conversion to another language, code or, notation; and b) reproduction in a different material form.

A system may include, inter alia, one or more information processing systems and/or computers and at least a machine-readable or computer-readable medium, allowing a system, to read data, instructions, messages or message packets, and other information from the machine-readable or computer-readable medium. The machine-readable or computer-readable medium may include non-volatile memory, such as ROM, Flash memory, Disk drive memory, CD-ROM, and other permanent storage. Additionally, a machine-readable or computer-readable medium may include, for example, volatile storage such as RAM, buffers, cache memory, and network circuits. Furthermore, the machine-readable or computer-readable medium may include information in a transitory state medium such as a network link and/or a network interface, including a wired network or a wireless network, that allow a computer system to read such computer-readable information.

Figure 7:
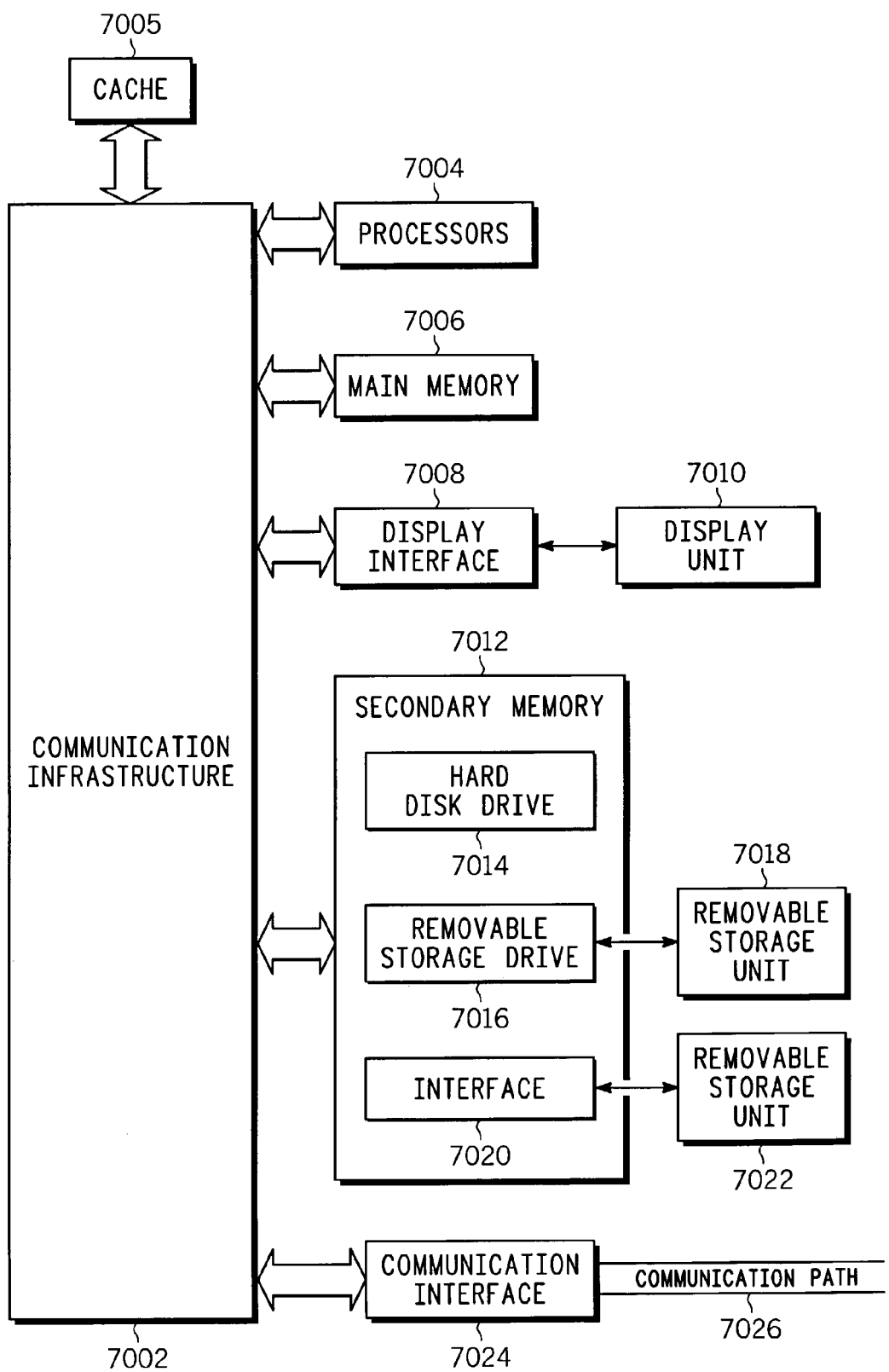
FIG. 7 is a block diagram of an information processing system useful for implementing embodiments of the present invention.

FIG. 7 is a block diagram of a computer system useful for implementing an embodiment of the present invention. The computer system of FIG. 7 includes multiple processors, such as processors 7004. The processors 7004 are connected to a communication infrastructure 7002 (e.g., a communications bus, cross-over bar, or network). At least one cache 7005 is also connected to the communication infrastructure 7002. Various software embodiments are described in terms of this exemplary computer system. After reading this description, it will become apparent to a person of ordinary skill in the relevant art(s) how to implement the invention using other computer systems and/or computer architectures.

The computer system can include a display interface 7008 that forwards graphics, text, and other data from the communication infrastructure 7002 (or from a frame buffer not shown) for display on the display unit 7010. The computer system also includes a main memory 7006, preferably random access memory (RAM), and may also include a secondary memory 7012. The secondary memory 7012 may include, for example, a hard disk drive 7014 and/or a removable storage drive 7016, representing a floppy disk drive, a magnetic tape drive, an optical disk drive, etc. The removable storage drive 7016 reads from and/or writes to a removable storage unit 7018 in a manner well known to those having ordinary skill in the art. Removable storage unit 7018, represents a floppy disk, magnetic tape, optical disk, etc., which is read by and written to by removable storage drive 7016. As will be appreciated, the removable storage unit 7018 includes a computer usable storage medium having stored therein computer software and/or data.

In alternative embodiments, the secondary memory 7012 may include other similar means for allowing computer programs or other instructions to be loaded into the computer system. Such means may include, for example, a removable storage unit 7022 and an interface 7020. Examples of such may include a program cartridge and cartridge interface (such as that found in video game devices), a removable memory chip (such as an EPROM, or PROM) and associated socket, and other removable storage units 7022 and interfaces 7020 which allow software and data to be transferred from the removable storage unit 7022 to the computer system.

The computer system may also include a communications interface 7024. Communications interface 7024 allows software and data to be transferred between the computer system and external devices. Examples of communications interface 7024 may include a modem, a network interface (such as an Ethernet card), a communications port, a PCM-CIA slot and card, etc. Software and data transferred via communications interface 7024 are in the form of signals which may be, for example, electronic, electromagnetic, optical, or other signals capable of being received by communications interface 7024. These signals are provided to communications interface 7024 via a communications path (i.e., channel) 7026. This channel 7026 carries signals and may be implemented using wire or cable, fiber optics, a phone line, a cellular phone link, an RF link, and/or other communications channels.

In this document, the terms "computer program medium," "computer-usable medium," "machine-readable medium" and "computer-readable medium" are used to generally refer to media such as main memory 7006 and secondary memory 7012, removable storage drive 7016, a hard disk installed in hard disk drive 7014, and signals. These computer program products are means for providing software to the computer system. The computer-readable medium allows the computer system to read data, instructions, messages or message packets, and other computer-readable information from the computer-readable medium. The computer-readable medium, for example, may include non-volatile memory, such as Floppy, ROM, Flash memory, Disk drive memory, CD-ROM, and other permanent storage. It is useful, for example, for transporting information, such as data and computer instructions, between computer systems. Furthermore, the computer-readable medium may include computer-readable information in a transitory state medium such as a network link and/or a network interface, including a wired network or a wireless network, that allow a computer to read such computer-readable information.

Computer programs (also called computer control logic) are stored in main memory 7006 and/or secondary memory 7012. Computer programs may also be received via communications interface 7024. Such computer programs, when executed, enable the computer system to perform the features of the present invention as discussed herein. In particular, the computer programs, when executed, enable the processor 7004 to perform the features of the computer system. Accordingly, such computer programs represent controllers of the computer system.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for segmenting a cache shared by a plurality of processors, said method comprising the steps of:
    allocating a first segment of the cache to a first processor and a second segment of the cache to a second processor;
    monitoring an execution time of at least one task on the first processor, the at least one task having an allowed execution time; and
    if the execution time of the at least one task is greater than the allowed execution time minus a predetermined margin, increasing the size of the first segment of the cache that is allocated to the first processor.

2. The method of claim 1, further comprising the step of:
    if the execution time of the at least one task is less than the allowed execution time minus the predetermined margin, decreasing the size of the first segment of the cache that is allocated to the first processor.

3. The method of claim 2, further comprising the step of:
    if the execution time of the at least one task is not greater than the allowed execution time minus the predetermined margin and is not less than the allowed execution time minus the predetermined margin, maintaining the size of the first segment of the cache that is allocated to the first processor.

4. The method of claim 3, further comprising the step of:
    repeating the monitoring step and at least one of the increasing, decreasing, and maintaining steps each time execution of a time critical task is completed by the first processor.

5. The method of claim 1, wherein the increasing step includes the sub-steps of:
    if the execution time of the at least one task is greater than the allowed execution time minus a predetermined margin, making a first determination to determine if the execution time of the at least one task was greater than the allowed execution time minus the predetermined margin due to cache misses; and
    increasing the size of the first segment of the cache that is allocated to the first processor only if the first determination is positive.

6. The method of claim 5, wherein the step of making a first determination includes the sub-step of determining if a number or percentage of cache misses by the first processor during execution of the at least one task is greater than a threshold.

7. The method of claim 2, wherein the decreasing step includes the sub-steps of:
- if the execution time of the at least one task is less than the allowed execution time minus a predetermined margin, making a second determination to determine if a number or percentage of cache misses by the second processor is greater than a threshold; and
- decreasing the size of the first segment of the cache that is allocated to the first processor only if the second determination is positive.

8. The method of claim 1, wherein the predetermined margin is zero.

9. The method of claim 1, wherein the first processor is a baseband processor for handling call operations of a mobile phone and the second processor is another processor of the mobile phone.

10. The method of claim 1, wherein the second processor comprises a plurality of processors.

11. A machine-readable medium encoded with a program for segmenting a cache shared by a plurality of processors, said program containing instructions for performing the steps of:
- allocating a first segment of the cache to a first processor and a second segment of the cache to a second processor;
- monitoring an execution time of at least one task on the first processor, the at least one task having an allowed execution time; and
- if the execution time of the at least one task is greater than the allowed execution time minus a predetermined margin, increasing the size of the first segment of the cache that is allocated to the first processor.

12. The machine-readable medium of claim 11, wherein said program further contains instructions for performing the step of:
- if the execution time of the at least one task is less than the allowed execution time minus the predetermined margin, decreasing the size of the first segment of the cache that is allocated to the first processor.

13. The machine-readable medium of claim 12, wherein said program further contains instructions for performing the step of:
- if the execution time of the at least one task is not greater than the allowed execution time minus the predetermined margin and is not less than the allowed execution time minus the predetermined margin, maintaining the size of the first segment of the cache that is allocated to the first processor.

14. The machine-readable medium of claim 11, wherein the increasing step includes the sub-steps of:
- if the execution time of the at least one cask is greater than the allowed execution time minus a predetermined margin, making a first determination to determine if the execution time of the at least one task was greater than the allowed execution time minus the predetermined margin due to cache misses; and
- increasing the size of the first segment of the cache that is allocated to the first processor only if the first determination is positive.

15. The machine-readable of claim 11, wherein the predetermined margin is zero.

16. An information processing system comprising:
- at least first and second processors;
- a shared cache coupled to the first and second processors; and
- a cache controller coupled to the cache and segmenting the cache between the first and second processors, the cache controller operating such that if an execution time of at least one task on the first processor is greater than an allowed execution time for the at least one task minus a predetermined margin, a size of a first segment of the cache allocated to the first processor is increased.

17. The information processing system of claim 16, wherein the cache controller further operating such that if the execution time of the at least one task is less than the allowed execution time minus the predetermined margin, the size of the first segment of the cache allocated to the first processor is decreased.

18. The information processing system of claim 17, wherein the cache controller further operating such that if the execution time of the at least one task is not greater than the allowed execution time minus the predetermined margin and is not less than the allowed execution time minus the predetermined margin, the size of the first segment of the cache allocated to the first processor is not changed.

19. The information processing system of claim 16, wherein the cache controller only increases the size of the first segment of the cache if the execution time of the at least one task was greater than the allowed execution time minus the predetermined margin due to cache misses.

20. The information processing system of claim 16, wherein the predetermined margin is zero.

21. The information processing system of claim 16, wherein the information processing system is a mobile phone, the first processor is a baseband processor for handling call operations, and the second processor is an application processor.

* * * * *